United States Patent
He (10) Patent No.: US 9,256,020 B2
(45) Date of Patent: Feb. 9, 2016

(54) LIGHT-GUIDING PLATE COMPRISING A PLURALITY OF TRENCHES RADIATING FROM A FIRST INCIDENT SURFACE AND A PLURALITY OF MESH DOTS, BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventor: Hu He, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 118 days.

(21) Appl. No.: 14/116,761

(22) PCT Filed: Aug. 15, 2013

(86) PCT No.: PCT/CN2013/081568
§ 371 (c)(1),
(2) Date: Nov. 8, 2013

(87) PCT Pub. No.: WO2015/018102
PCT Pub. Date: Feb. 12, 2015

(65) Prior Publication Data
US 2015/0042923 A1    Feb. 12, 2015

(51) Int. Cl.
*G02F 1/1335*    (2006.01)
*F21V 7/04*    (2006.01)
*F21V 8/00*    (2006.01)

(52) U.S. Cl.
CPC ............ *G02B 6/0038* (2013.01); *G02B 6/0043* (2013.01)

(58) Field of Classification Search
CPC ............ G02F 1/133615; G02B 6/0038; G02B 6/0043
USPC ............... 349/62, 65; 362/606, 608, 617, 621
See application file for complete search history.

(56) References Cited

U.S. PATENT DOCUMENTS

2004/0012945 A1*    1/2004    Yamashita et al. .............. 362/31
2004/0022049 A1    2/2004    Chang
(Continued)

FOREIGN PATENT DOCUMENTS

CN            1479848 A      3/2004
CN            1710478 A     12/2005
(Continued)

*Primary Examiner* — Paul Lee
(74) *Attorney, Agent, or Firm* — Andrew C. Cheng (57) ABSTRACT

The present invention discloses light-guiding plate, backlight module and liquid crystal display device. The light-guiding plate includes first incident surface, light-emitting surface, bottom surface and side surface; wherein light-emitting surface being connected to first incident surface, bottom surface being connected to first incident surface, light-emitting surface being connected to side surface, bottom surface being connected to side surface, the angle between first incident surface and side surface connected to first incident surface being obtuse, and light-emitting surface including a plurality of trenches radiating from first incident surface. The radiating trenches disposed on light-emitting surface have certain converging effect on light propagating in light-guiding plate. The propagating light will propagate along the trenches. As such, the incident light can be distributed uniformly over the entire light-guiding plate, and the dark corner phenomenon is eliminated and the emission uniformity of the light-guiding plate is improved.

17 Claims, 5 Drawing Sheets

(56) References Cited

U.S. PATENT DOCUMENTS

| | | | |
|---|---|---|---|
| 2006/0044834 A1* | 3/2006 | Yu | G02B 6/0038 362/620 |
| 2010/0027293 A1* | 2/2010 | Li | 362/619 |
| 2011/0096570 A1* | 4/2011 | Vissenberg | G02B 6/4298 362/615 |
| 2011/0176089 A1* | 7/2011 | Ishikawa | G02B 6/0018 349/65 |
| 2011/0205759 A1* | 8/2011 | Kurata | G02B 6/002 362/611 |
| 2012/0182498 A1* | 7/2012 | Jung et al. | 349/62 |

FOREIGN PATENT DOCUMENTS

| | | |
|---|---|---|
| CN | 101285964 A | 10/2008 |
| CN | 101460876 A | 6/2009 |

* cited by examiner

LIGHT-GUIDING PLATE COMPRISING A PLURALITY OF TRENCHES RADIATING FROM A FIRST INCIDENT SURFACE AND A PLURALITY OF MESH DOTS, BACKLIGHT MODULE AND LIQUID CRYSTAL DISPLAY DEVICE

BACKGROUND OF THE INVENTION

1. Field of the Invention

The present invention relates to the field of liquid crystal displaying techniques, and in particular to a light-guiding plate, backlight module and liquid crystal display device.

2. The Related Arts

Figure 1:
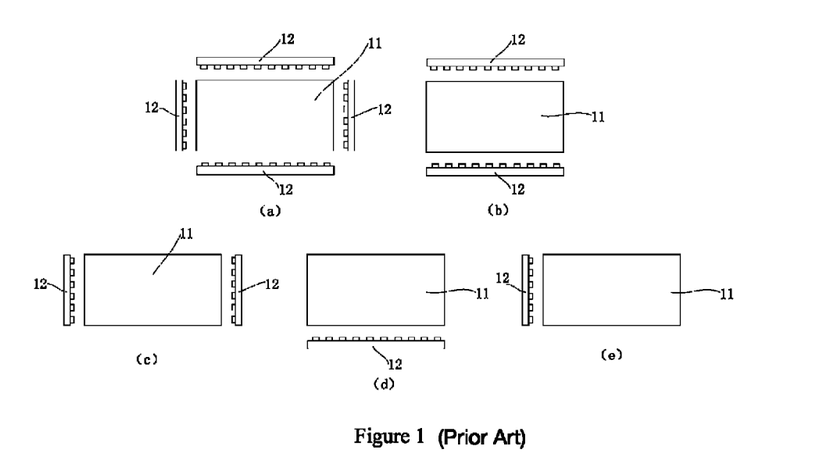
FIG. 1 is a schematic view showing the structure of a known edge-lit backlight module.

Due to the advantages of reduced thickness, light weight, low power consumption and low radiation, the liquid crystal display (LCD) devices find wide applications in the field of displaying for computers, mobile phones, electronic dictionary, and liquid crystal televisions. With the recent light efficiency improvement in liquid crystal display devices, a new trend of the liquid crystal display device is to reduce the number of light sources so as to reduce the structure of the backlight module used in the liquid crystal display device. As shown in FIG. 1, a backlight module of liquid crystal display device usually comprises a light-guiding plate 11 and light sources 12. The light sources 12 are disposed at the sides of the light-guiding plate 11. The backlight module progresses from the original four-edge lit ((a) of FIG. 1) to the two-long-side lit ((b) of FIG. 1), two-short-edge lit ((c) of FIG. 1) and single-long-edge lit ((d) of FIG. 1), or even to the single-short-edge lit in mass production ((e) of FIG. 1).

Figure 2:
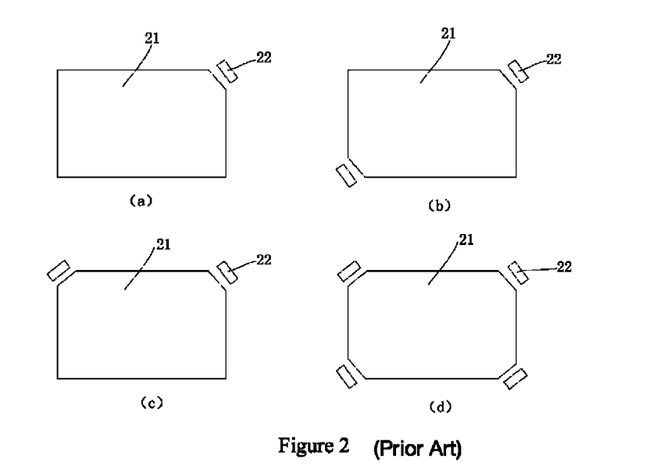
FIG. 2 is a schematic view showing the structure of a known corner-lit backlight module.

As the luminance of the light source improves, the further development based on the short-edge lit will be towards the corner lit, that is, light sources disposed at corners of the light-guiding plate. FIG. 2 shows a plurality of possibilities for corner lit at the light-guiding plate. In FIG. 2, (a) is to dispose a light source 22 at a corner of the light-guiding plate 21; (b) is to dispose a light source 22 respectively at two diagonal corners of the light-guiding plate 21; (c) is to disposed a light source 22 respectively at two corners at the same side of the light-guiding plate 21; and (d) is to dispose a light source 22 respectively at four corners of the light-guiding plate 21. In the corner-lit design, an important issue is how to import the light from the corners of the light-guiding plate to emit uniformly from the light-emitting surface of the light-guiding plate. For small-sized liquid crystal display device, because of the short propagation distance of the light, the mesh dots can be disposed on the bottom (opposite to the light-emitting surface) of the light-guiding plate. For example, the uniform light-emission from the light-emitting surface of the light-guiding plate can be realized by change the size or the density of the mesh dots. However, for large-sized liquid crystal display device, because of the longer propagation distance of the light, the mesh dots disposed on the bottom (opposite to the light-emitting surface) of the light-guiding plate cannot realize the uniform light-emission from the light-emitting surface of the light-guiding plate.

Figure 3:
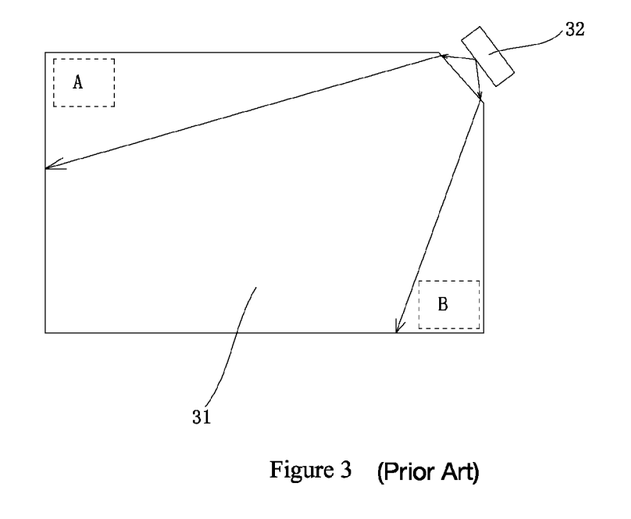
FIG. 3 is a schematic view showing the structure of a known single-corner-lit backlight module.

In addition, the light source in actual application, such as, light-emitting diode (LED) usually has specific scattering angle. When emitting light at the corners of the light-guiding plate, the scattering angle of the light from the LED after entering the light-guiding plate is smaller than the scattering angle of the original light source. As shown in FIG. 3, the LED 32 as the light source usually has a scattering angle of 120°. The deflection ratio of a light-guiding plate 31 is usually larger than 1. For example, when the light-guiding plate 31 is made of PMMA, the deflection ratio is about 1.49. When the emitted light enters the light-guiding plate 31, the scattering angle in the light-guiding plate 31 is smaller because the light will be deflected (shown as arrow in the figure). As a result, the corner A and corner B neighboring the light-emitting corner on the light-guiding plate 31 cannot receive light and becomes dark, which severely affects the uniformity of the light-emission of the light-guiding plate 31.

SUMMARY OF THE INVENTION

To solve the known technical issue, the present invention provides a light-guiding plate, which comprises a first incident surface, a light-emitting surface, a bottom surface and a side surface; wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface.

The present invention also provides a backlight module, which comprises a light-guiding plate and a light source; wherein the light-guiding plate further comprising a first incident surface, a light-emitting surface, a bottom surface and a side surface; a side of the first incident surface being disposed with the light source, wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface.

The present invention also provides a liquid crystal display device, which comprises a liquid crystal display panel and a backlight module; the liquid crystal display panel and the backlight module being disposed oppositely, the backlight module providing displaying light source to the liquid crystal display panel for the liquid crystal display panel to display images; the backlight module further comprising a light-guiding plate and a light source; a side of the first incident surface being disposed with the light source, wherein the light-guiding plate further comprising a first incident surface, a light-emitting surface, a bottom surface and a side surface; wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface.

According to a preferred embodiment of the present invention, the trenches extend to the side surface.

According to a preferred embodiment of the present invention, the bottom surface comprises a plurality of mesh dots, the mesh dots make an incident light emit from the light-emitting surface, the distribution density of mesh dots increases gradually away from the first incident surface.

According to a preferred embodiment of the present invention, the light-guiding plate further comprises a second incident surface, the light-emitting surface is connected to the second incident surface, the bottom surface is connected to the second incident surface, the second incident surface is disposed at a location on the same side as the first incident surface or diagonally from the first incident surface, and the light-emitting surface further comprises a plurality of trenches radiating from the second incident surface.

According to a preferred embodiment of the present invention, the light-guiding plate further comprises a third incident surface and a fourth incident surface, the third incident surface and the fourth incident surface are both connected to the light-emitting surface, the third incident surface and the fourth incident surface are both connected to the bottom surface, the third incident surface and the fourth incident surface are disposed on the same side or diagonally, and the light-emitting surface further comprises a plurality of trenches radiating from the third incident surface and the fourth incident surface.

According to a preferred embodiment of the present invention, the trench has a V shape, with a rounded bottom angle, and the convex platforms among plurality of V-shaped trenches also have rounded top angle.

According to a preferred embodiment of the present invention, the convex platforms among the plurality of trenches have arc cross-sections.

In the present invention, when the incident light reaches the incident surfaces of the light-guiding plate, the radiating trenches disposed on the light-emitting surface of the light-guiding plate have certain converging effect on the light propagating in the light-guiding plate. That is, the propagating light will propagate along the trenches. As such, the incident light can be distributed uniformly over the entire light-guiding plate, and the dark corner phenomenon is eliminated and the emission uniformity of the light-guiding plate is improved. In addition, the light perpendicular to the trenches is reflected back to the light-guiding plate during full reflection so as to increase the light efficiency.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following describes the embodiments of the present invention in details. The embodiments are depicted in the drawings, wherein the same number indicates the same part. The following refers to the drawings and embodiments for detailed description of the present invention. In the following, to prevent the unnecessary details of commonly known structures and/or functions from cluttering the concept of the present invention, the details of commonly known structures and/or functions are omitted.

First Embodiment

Figure 4:
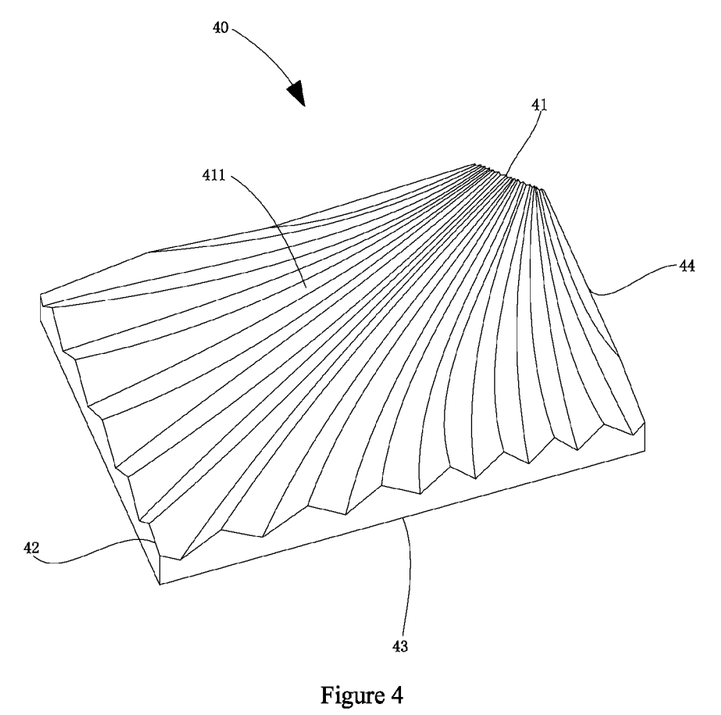
FIG. 4 is a schematic top view showing the light-guiding plate of the first embodiment of the present invention.
Figure 5:
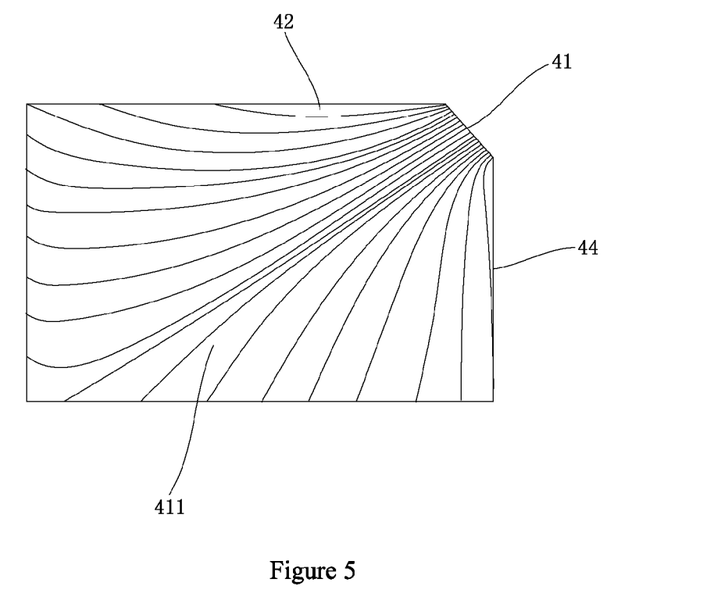
FIG. 5 is a top view showing the light-guiding plate of the first embodiment of the present invention.

FIG. 4 is a schematic top view showing the light-guiding plate of the first embodiment of the present invention; FIG. 5 is a top view showing the light-guiding plate of the first embodiment of the present invention; and FIG. 6 is a schematic bottom view showing the light-guiding plate of the first embodiment of the present invention.

Figure 6:
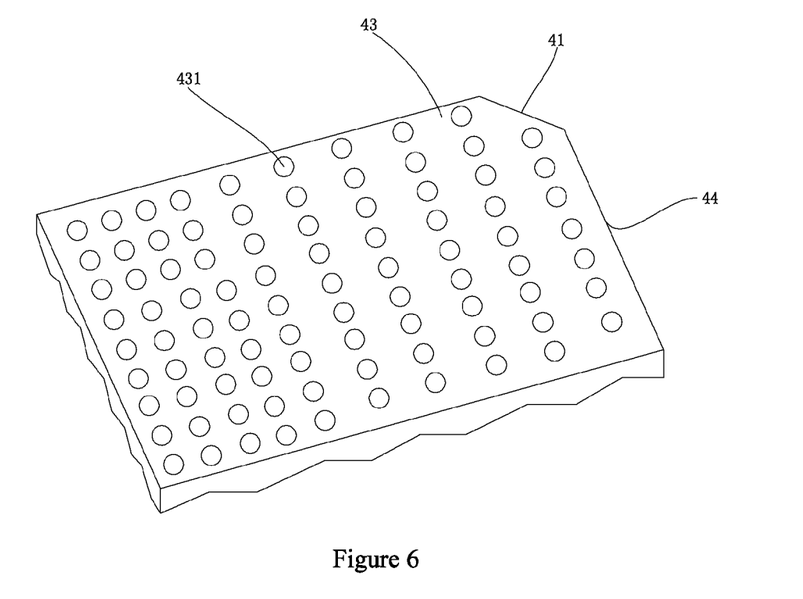
FIG. 6 is a schematic bottom view showing the light-guiding plate of the first embodiment of the present invention.

Referring to FIGS. 4-6, a light-guiding plate 40 of the first embodiment of the present invention comprises a first incident surface 41, a light-emitting surface 42, a bottom surface 43 and four side surfaces 44; wherein the light-emitting surface 42 is connected to the first incident surface 41, the bottom surface 43 is connected to the first incident surface 41, the light-emitting surface 42 is connected to each of the four side surfaces 44, the bottom surface 43 is connected to each of the four side surfaces 44, the angle between the first incident surface 41 and the side surface 44 connected to the first incident surface 41 is obtuse, and the light-emitting surface 42 comprises a plurality of trenches 411 radiating from the first incident surface 41 and reaching to each of the four side surfaces 44.

In the instant embodiment, the bottom surface 43 further comprises a plurality of mesh dots 431. The mesh dots 431 can be formed by printing or roller pressing. The mesh dots 431 make an incident light emit from the light-emitting surface 42. The distribution density of mesh dots 431 increases gradually away from the first incident surface 41. When the incident light reaches the mesh dots 431 disposed on the bottom surface 43, the incident light emits towards the direction of the light-emitting surface 42 under the effect of the mesh dots 431. The distribution density of the mesh dots 431 is lower at the end close to the first incident surface 41 and higher away from the first incident surface 41. This is because the end close to the first incident surface 41 receives more light so that the number of mesh dots can be less to cause less effect on the incident light. On the other hand, the end away from the first incident surface 41 receives less light so that the number of mesh dots must be more to cause more effect on the incident light. As such, the luminance of the emitted light from the light-emitting surface 42 of the light-guiding plate 40 is more uniform.

Furthermore, the light-guiding plate of the present invention further comprises side surfaces 44. The first incident surface 41 is connected to the side surfaces 44, and the angle between the first incident surface 41 and the side surface 44 is obtuse.

In the instant embodiment, when the incident light reaches the first incident surface 41, the radiating trenches 411 disposed on the light-emitting surface 42 of the light-guiding plate 40 have certain converging effect on the light propagating in the light-guiding plate 40. That is, the propagating light will propagate along the trenches 411. As such, the incident light can be distributed uniformly over the entire light-guiding plate 40, and the dark corner phenomenon is eliminated and the emission uniformity of the light-guiding plate 40 is improved. In addition, the light perpendicular to the trenches 411 is reflected back to the light-guiding plate 40 during full reflection so as to increase the light efficiency.

Figure 7:
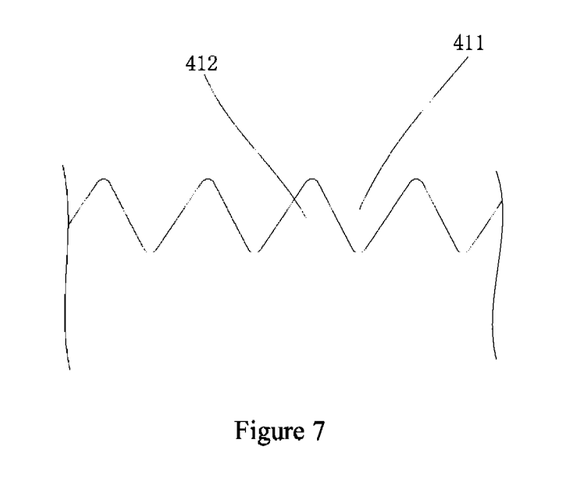
FIG. 7 and FIG. 8 are schematic views showing the trenches of other shapes according to the first embodiment of the present invention.
Figure 8:
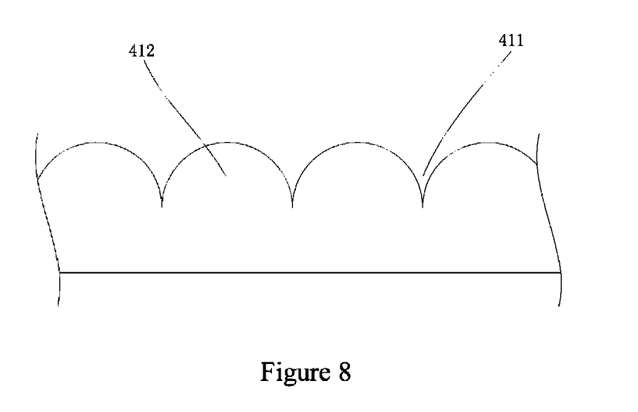

In addition, as shown in FIG. 4, the trench 411 has a V shape, but is not restricted to the shape of the instant embodiment. FIG. 7 and FIG. 8 are schematic views showing the trenches of other shapes according to the first embodiment of the present invention. As shown in FIG. 7, the trench 411 has a V shape, but with a rounded bottom angle, and the convex platforms among plurality of V-shaped trenches also have rounded top angle. Also, as shown in FIG. 8, the convex platforms among the plurality of trenches have arc cross-sections.

Figure 9:
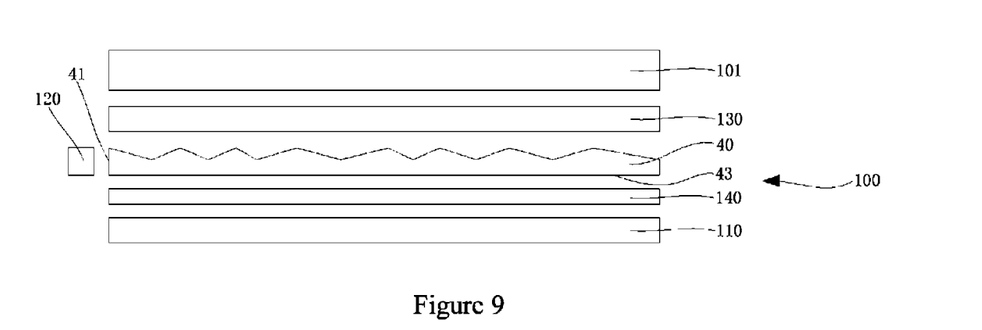
FIG. 9 is a schematic bottom view showing the structure of the liquid crystal display device of the first embodiment of the present invention.

FIG. 9 is a schematic bottom view showing the structure of the liquid crystal display device of the first embodiment of the present invention.

As shown in FIG. 9, a liquid crystal display device of the first embodiment of the present invention comprises a liquid crystal display panel 101 and a backlight module 100. The liquid crystal display panel 101 and the backlight module 100 are disposed oppositely. The backlight module 100 provides displaying light source to the liquid crystal display panel 101 for the liquid crystal display panel 101 to display images. The backlight module 100 further comprises a back plate 110, a light-guiding plate 40, a light source 120, an optical film 130 and a reflector 140.

The light-guiding plate 40 is disposed on the back plate 110, and the light source 120 is disposed on a side of the first incident surface 41 of the light-guiding plate 40. The reflector 140 is disposed between the light-guiding plate 40 and the back plate 110 for reflecting the light emitted from the bottom surface 43 of the light-guiding plate 40 back to the light-guiding plate 40 to improve the optical effect of the light emitted from the light-emitting surface 42 of the light-guiding plate 40.

In the instant embodiment, light source 120 can be an LED.

Second Embodiment

Figure 10:
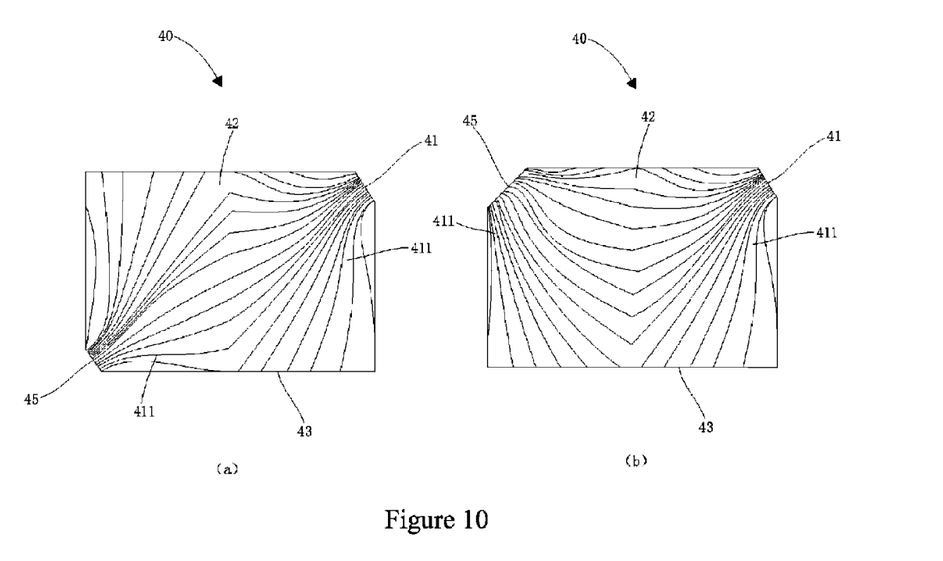
FIG. 10 is a schematic view showing the light-guiding plate of the second embodiment of the present invention.

FIG. 10 is a schematic view showing the light-guiding plate of the second embodiment of the present invention.

As shown in FIG. 10, the second embodiment differs from the first embodiment in that the light-guiding plate 40 further comprises a second incident surface 45. The light-emitting surface 42 is connected to the second incident surface 45. The bottom surface 43 is connected to the second incident surface 45. The second incident surface 45 is disposed at a location on the same side as the first incident surface 41 ((b) of the figure) or diagonally from the first incident surface 41 ((a) of the figure). The light-emitting surface 42 further comprises a plurality of trenches 411 radiating from the second incident surface 45. A part of the trenches 411 radiating from the first incident surface 41 extend to the side surface connected to the first incident surface 41 and the side surface with wider width opposite to the first incident surface 41. A part of the trenches 411 radiating from the second incident surface 45 extend to the side surface connected to the second incident surface 45 and the side surface with wider width opposite to the second incident surface 45. The other part of the trenches 411 radiating from the first incident surface 41 are connected to the other part of the trenches 411 radiating from the second incident surface 45. Therefore, as shown in the figure, the light-guiding plate 40 of the second embodiment is equivalent to splice two light-guiding plates 40 of the first embodiment to form two incident surfaces.

Third Embodiment

Figure 11:
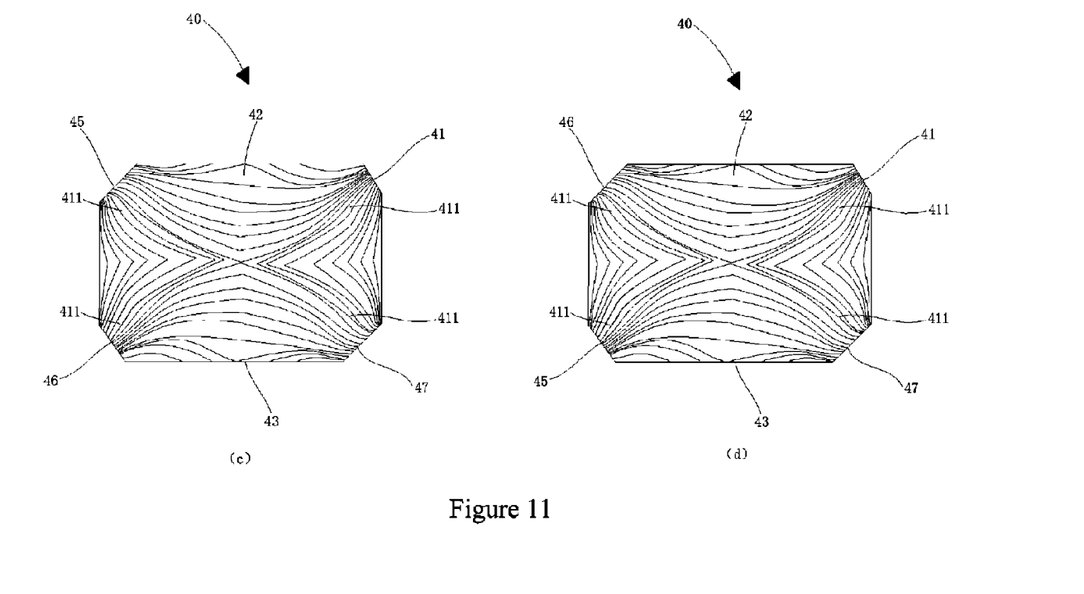
FIG. 11 is a schematic view showing the light-guiding plate of the third embodiment of the present invention.

FIG. 11 is a schematic view showing the light-guiding plate of the third embodiment of the present invention.

As shown in FIG. 11, the third embodiment differs from the second embodiment in that the light-guiding plate 40 further comprises a third incident surface 46 and a fourth incident surface 47. The third incident surface 46 and the fourth incident surface 47 are both connected to the light-emitting surface 42. The third incident surface 46 and the fourth incident surface 47 are both connected to the bottom surface 43. The third incident surface 46 and the fourth incident surface 47 are disposed on the same side ((c) of the figure) or diagonally ((d) of the figure). The light-emitting surface 42 further comprises a plurality of trenches 411 radiating from the third incident surface 46 and the fourth incident surface 47. A part of the trenches 411 radiating from each of the incident surfaces extend to the side surface connected to the corresponding incident surface respectively. As shown in the figure, the light-guiding plate 40 of the third embodiment is equivalent to splice four light-guiding plates 40 of the first embodiment to form four incident surfaces.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A light-guiding plate, which comprises a first incident surface, a light-emitting surface, a bottom surface and a side surface; wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface, wherein the bottom surface comprises a plurality of mesh dots, the mesh dots make an incident light emit from the light-emitting surface, the distribution density of mesh dots increases gradually away from the first incident surface.

2. The light-guiding plate as claimed in claim 1, wherein the trenches extend to the side surface.

3. The light-guiding plate as claimed in claim 1, wherein the light-guiding plate further comprises a second incident surface, the light-emitting surface is connected to the second incident surface, the bottom surface is connected to the second incident surface, the second incident surface is disposed at a location on the same side as the first incident surface or diagonally from the first incident surface, and the light-emitting surface further comprises a plurality of trenches radiating from the second incident surface.

4. The light-guiding plate as claimed in claim 1, wherein the light-guiding plate further comprises a third incident surface and a fourth incident surface, the third incident surface and the fourth incident surface are both connected to the light-emitting surface, the third incident surface and the fourth incident surface are both connected to the bottom surface, the third incident surface and the fourth incident surface are disposed on the same side or diagonally, and the light-emitting surface further comprises a plurality of trenches radiating from the third incident surface and the fourth incident surface.

5. The light-guiding plate as claimed in claim 1, wherein the trench has a V shape.

6. The light-guiding plate as claimed in claim 5, wherein the V-shape trench has a rounded bottom angle, and a plurality of convex platforms among plurality of V-shaped trenches also have rounded top angle.

7. The light-guiding plate as claimed in claim 1, wherein a plurality of convex platforms among the plurality of trenches have arc cross-sections.

8. A backlight module, which comprises a light-guiding plate and a light source; wherein the light-guiding plate further comprising a first incident surface, a light-emitting surface, a bottom surface and a side surface; a side of the first incident surface being disposed with the light source, wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface, wherein the bottom surface comprises a plurality of mesh dots, the mesh dots make an incident light emit from the light-emitting surface, the distribution density of mesh dots increases gradually away from the first incident surface.

9. The backlight module as claimed in claim 8, wherein the trenches extend to the side surface.

10. The backlight module as claimed in claim 8, wherein the light-guiding plate further comprises a second incident surface, the light-emitting surface is connected to the second incident surface, the bottom surface is connected to the second incident surface, the second incident surface is disposed at a location on the same side as the first incident surface or diagonally from the first incident surface, and the light-emitting surface further comprises a plurality of trenches radiating from the second incident surface.

11. The backlight module as claimed in claim 10, wherein the light-guiding plate further comprises a third incident surface and a fourth incident surface, the third incident surface and the fourth incident surface are both connected to the light-emitting surface, the third incident surface and the fourth incident surface are both connected to the bottom surface, the third incident surface and the fourth incident surface are disposed on the same side or diagonally, and the light-emitting surface further comprises a plurality of trenches radiating from the third incident surface and the fourth incident surface.

12. The backlight module as claimed in claim 8, wherein the trench has a V shape.

13. A liquid crystal display device, which comprises a liquid crystal display panel and a backlight module; the liquid crystal display panel and the backlight module being disposed oppositely, the backlight module providing displaying light source to the liquid crystal display panel for the liquid crystal display panel to display images; the backlight module further comprising a light-guiding plate and light source; wherein the light-guiding plate further comprising a first incident surface, a light-emitting surface, a bottom surface and a side surface; a side of the first incident surface being disposed with the light source, wherein the light-emitting surface being connected to the first incident surface, the bottom surface being connected to the first incident surface, the light-emitting surface being connected to the side surface, the bottom surface being connected to the side surface, the angle between the first incident surface and the side surface connected to the first incident surface being obtuse, and the light-emitting surface comprising a plurality of trenches radiating from the first incident surface, wherein the bottom surface comprises a plurality of mesh dots, the mesh dots make an incident light emit from the light-emitting surface, the distribution density of mesh dots increases gradually away from the first incident surface.

14. The liquid crystal display device as claimed in claim 13, wherein the trenches extend to the side surface.

15. The liquid crystal display device as claimed in claim 13, wherein the light-guiding plate further comprises a second incident surface, the light-emitting surface is connected to the second incident surface, the bottom surface is connected to the second incident surface, the second incident surface is disposed at a location on the same side as the first incident surface or diagonally from the first incident surface, and the light-emitting surface further comprises a plurality of trenches radiating from the second incident surface.

16. The liquid crystal display device as claimed in claim 15, wherein the light-guiding plate further comprises a third incident surface and a fourth incident surface, the third incident surface and the fourth incident surface are both connected to the light-emitting surface, the third incident surface and the fourth incident surface are both connected to the bottom surface, the third incident surface and the fourth incident surface are disposed on the same side or diagonally, and the light-emitting surface further comprises a plurality of trenches radiating from the third incident surface and the fourth incident surface.

17. The liquid crystal display device as claimed in claim 13, wherein the trench has a V shape.

\* \* \* \* \*